United States Patent [19]

Herlitzek

[11] 4,245,519
[45] Jan. 20, 1981

[54] MULTISPEED REVERSIBLE TRANSMISSION SHIFTABLE UNDER LOAD

[75] Inventor: Werner Herlitzek, Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 826,968

[22] Filed: Aug. 22, 1977

[51] Int. Cl.³ .............................................. F16H 3/08
[52] U.S. Cl. ...................................................... 74/331
[58] Field of Search ......................................... 74/331

[56] References Cited

U.S. PATENT DOCUMENTS

| | | | |
|---|---|---|---|
| 2,400,830 | 5/1946 | Kinnucan et al. | 74/331 |
| 2,825,232 | 3/1958 | Sieving et al. | 74/331 |
| 2,953,942 | 9/1960 | Schwartz et al. | 74/331 |
| 2,972,899 | 2/1961 | Niggermann | 74/331 |
| 2,972,901 | 2/1961 | Gerst | 74/331 |

*Primary Examiner*—Samuel Scott
*Assistant Examiner*—Wesley S. Ratliff, Jr.
*Attorney, Agent, or Firm*—Karl F. Ross

[57] ABSTRACT

A transmission of the multispeed reversible type, shiftable under load (i.e. having continuously engaging gears establishing the several speeds) comprising a one-piece housing formed with a window large enough to permit the various speed-determining gears and clutches to be introduced and closed by a cover in which the input shaft is journaled. The speed-determining gears and clutches are mounted for rotation upon fixed shafts which are held against rotation and span opposite walls of the housing. Each of the fixed shafts has a flange on one end thereof which is bolted to the housing upon insertion of the shaft through an opening on the side of the housing provided with the flange.

7 Claims, 4 Drawing Figures

MULTISPEED REVERSIBLE TRANSMISSION SHIFTABLE UNDER LOAD

CROSS-REFERENCE TO RELATED APPLICATION

This application is related to my concurrently filed, commonly assigned, copending application Ser. No. 826,969, now U.S. Pat. No. 4,145,935.

FIELD OF THE INVENTION

The present invention relates to a multispeed reversible transmission which is shiftable under load, i.e. has a multiplicity of pairs of continuously meshing gears which are rendered effective for connecting an input shaft with a load by actuation of respective clutches. More particularly, the invention relates to a transmission for use in an automotive vehicle and like applications in which the input shaft is driven substantially at a constant rate (e.g. by an internal combustion engine) and in a single sense while the output shaft can be rotated reversibly and at different rates in accordance with the number of stages or steps in the transmission ratio of the transmission.

BACKGROUND OF THE INVENTION

Such transmissions can comprise at least two shafts in addition to the input shaft, each of which is provided with a respective gear, the gears being connected by direction-controlling clutches with other gears which can be in mesh with one another and these gears, in turn, can be connected with yet other gears which ultimately mesh with a gear driving the output shaft (see U.S. Pat. No. 3,838,455).

In conventional transmissions for the aforedescribed purpose, the shafts which carry the transmission gearing, i.e. the gear and clutch shafts, are mounted in a transmission housing e.g. by being preassembled on the shaft outside the housing and then attached to the housing. For such purpose, the housing must be multipartite and must be provided with covers on the shaft bearings. A multipartite housing of this type is difficult and expensive to fabricate.

There is described in U.S. Pat. No. 3,465,609 a reversible transmission which uses clutches and provides, for the first and fourth speeds as well as for the output shaft, a separate housing apart from the housing which holds the transmission elements for the second and third speeds and for determining the direction of rotation of the output shaft. In this construction, like those discussed above, the bipartite configurations of the housing result in high construction costs.

When more than two speeds are required in a transmission of this type, moreover, it is necessary to provide an undesirably large axial dimension since, in this case, three shiftable clutches must be provided with the associated gear wheels on a common shaft.

Reference may be made to the German printed application (Auslegeschrift) DT-AS No. 1 920 985 which describes a reversible transmission having pairs or trains of gears which are continuously in mesh with one another and which use a one-piece transmission housing and which also has gear shafts fixed to the housing and upon which the transmission gears rotate. This housing is provided with a closable opening dimensioned to enable introduction of the transmission components and indeed premounted; assemblies of these elements (gears and clutches) could also be introduced through this opening. However, in this transmission it was necessary to use synchronous clutching arrangements and hence a synchromesh type construction which could not be accommodated readily to a load-switchable multispeed reversing transmission. The openings in the transmission serve merely to afford access and hence the construction was relatively complicated and, in many cases, caused problems with respect to the journaling of elements and interference between the window and, for example, the drive shaft or structures associated therewith. Furthermore, the transmission did not have an especially compact configuration.

Austrian Pat. No. OE-PS 271 123 describes a transmission without a ratio or speed change, e.g. a worm transmission which also uses a one-piece housing with especially large roller bearings whose diameters are greater than the largest diameters of the associated transmission parts. The bearing bores serving as the mounting openings are closed after mounting of the respective shafts by bearing covers. In this construction it is possible to use rotating drive shafts even with a one-piece housing but each shaft must then be provided with a mounting opening or bearing bore which is larger than the largest diameter of a part to be carried by the respective shaft. The provision of such a large number of relatively large openings is naturally inconvenient and structurally unsound and indeed may interfere with the rational positioning of the interacting parts.

A further transmission is described in British Pat. No. 704,445 in which premounted structural units are introduced into the transmission housing through mounting openings. This transmission, like those mentioned previously, must provide an opening for each of the premounted units which is sufficient to enable it to be introduced into the housing. This system, therefore, suffers from the same disadvantages of the earlier arrangements mentioned above.

OBJECTS OF THE INVENTION

It is the principal object of the present invention to provide an improved multispeed transmission of the type in which pairs of mutually meshing gears remain in mesh during, prior to and after shifting of the transmission between speeds.

Another object of the invention is to provide a multispeed reversible transmission of the type which is shiftable under load whereby disadvantages of multipartite housing are avoided and which can be assembled inexpensively and conveniently with a minimum of cost and difficulty.

Yet another object of the invention is to provide a transmission which constitutes an improvement over the systems described above.

SUMMARY OF THE INVENTION

These objects and others which will become apparent hereinafter are attained, in accordance with the present invention, with a multispeed reversible transmission, shiftable under load, which comprises a one-piece transmission housing in which the various transmission gears and associated clutches are mounted upon respective shafts fixed to and enclosed in the housing which has an opening in a wall dimensioned to enable all of the internal units (gear and clutch assemblies) to be introduced through this opening. According to an essential feature of the invention, an input shaft is journaled in a housing cover which closes the aforedescribed opening and carries the first gear of the multigear transmission (see the aforementioned copending application).

According to a feature of the invention, each of the fixed shafts within the housing carries a respective gear and clutch assembly which is preformed outside of the housing with the necessary bearings and all of the gear and clutch members necessary for the particular fixed shaft, the assembly being introduced through the aforementioned opening with the fixed shaft being inserted through the assembly and secured in place in at least one sidewall of the transmission housing. The openings through which the fixed shafts can be inserted thus need be dimensioned only to accomodate the shaft diameter while the sole opening of greater size can be the opening which is closed by the transmission cover in which the input shaft is journaled.

According to another feature of the invention, each of the fixed shafts is formed at one end with a respective flange, this flange being bolted to a sidewall of the transmission housing to anchor the shaft against rotation and against axial displacement relative to the housing. Advantageously, the flanges of all of the shafts are provided on the sidewall of the housing opposite that which is formed with the window closed by the aforementioned cover.

According to still another feature of the invention, the cover may also carry the stator of a torque converter whose impeller element is driven by a shaft coaxial with the input shaft, the input shaft being connected to the turbine which is driven when the impeller is rotated.

The input shaft, moreover, can have within the housing an input or first gear which meshes continuously with second and third gears respectively rotatable on first and second fixed shafts within the transmission housing. The second gear can form an assembly of the type described with a first direction-determining clutch, a fourth gear, a first speed-determining clutch and a sixth gear. The members of this assembly are coaxial with one another and disposed in succession along the first shaft.

The third gear, similarly, can form a corresponding assembly rotatable on the second fixed shaft with a second direction-determining clutch, a fifth gear driven by this clutch and meshing with the fourth gear, a second speed-determining clutch and a seventh gear meshing with the sixth gear and driven by the second speed-determining clutch. An eighth gear can be rotatably coupled with the seventh gear and can mesh with a ninth gear rotatable upon a third fixed shaft.

The ninth gear can form still another such assembly with a third speed-determining clutch through which a tenth gear assembly can be connected to the ninth gear. The tenth gear, in turn, meshes continuously with the fifth gear.

An eleventh gear, namely, the output gear, can mesh with the ninth gear continuously and can drive an output shaft which is journaled in the housing.

According to still another feature of the invention, the third assembly can include a twelfth gear which can be coupled by a fourth speed-determining clutch to the tenth gear and which meshes through an idler gear with the third gear. The idler gear must in turn be rotatable upon an idler shaft and itself can constitute an "assembly" insertable through the opening in the transmission housing which is closed by the cover plate. The fixed first, second and third shafts each carry at one end a respective flange which can be bolted to the side of the housing opposite that at which the opening is provided while the idler shaft can also have a flange. The latter is preferably bolted to the housing from the exterior thereof on the same side as that at which the opening is formed.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
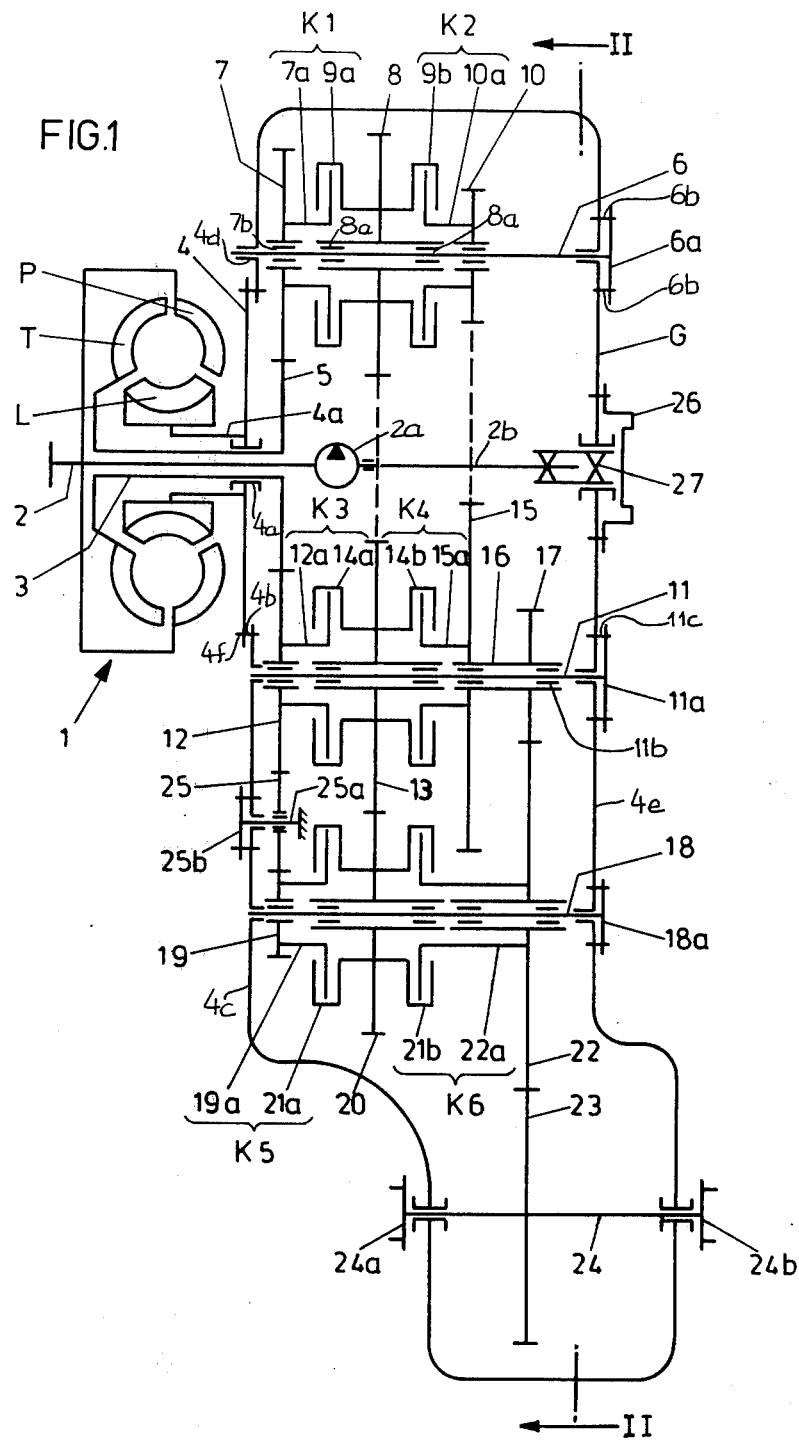
FIG. 1 is a vertical cross-sectional view in diagrammatic form with parts shifted for facility of illustration of the mutual engagement of the parts of a reversible multispeed transmission shiftable under load with four forward speeds and three reverse speeds and with a hydrodynamic torque converter at the input side of the transmission.
Figure 2:
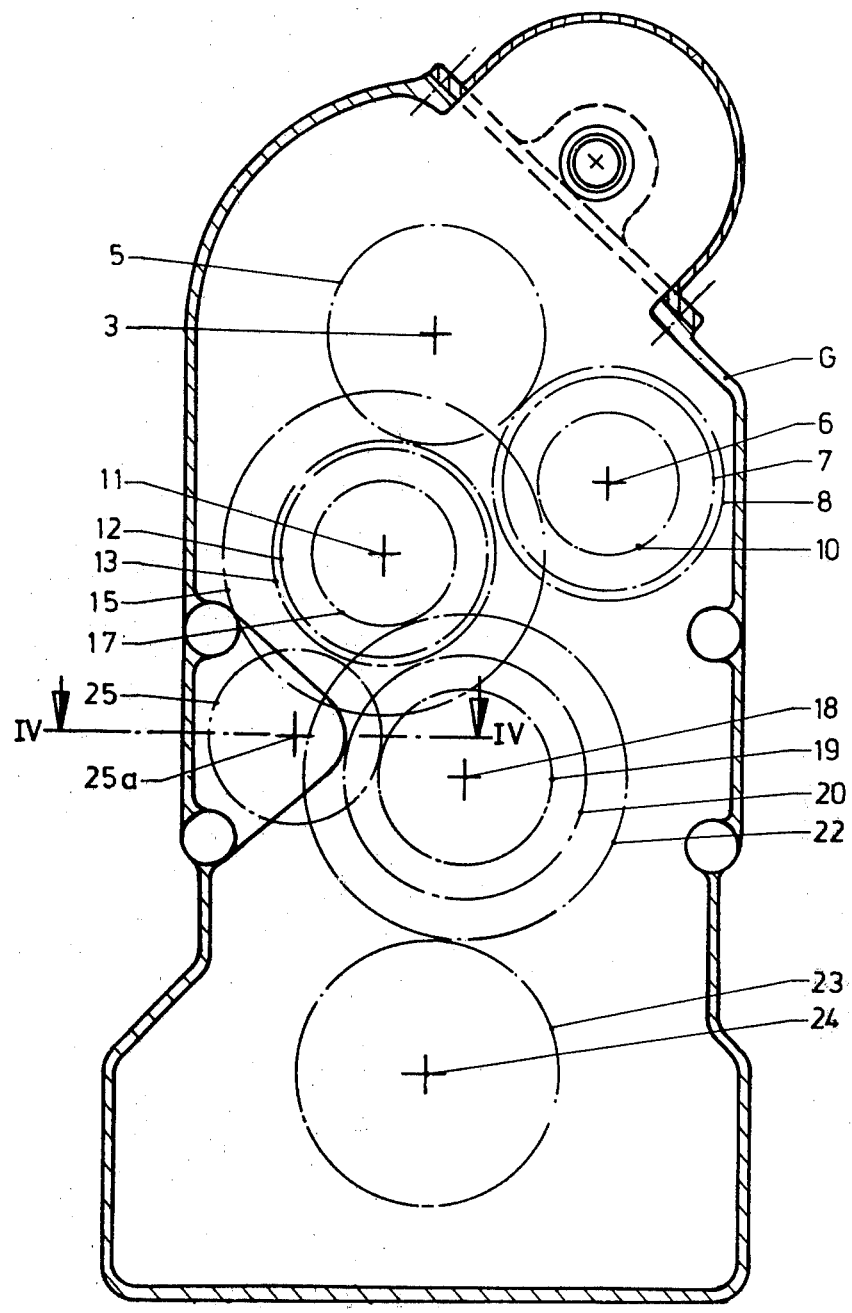
FIG. 2 is a section taken along the line II—II of FIG. 1.

The four-speed reversible transmission illustrated in FIG. 1 comprises a hydrodynamic torque converter 1 of the type commonly used in heavy-duty construction machines and which comprises an input shaft 2 which drives the pump or impeller P of the torque converter and which is rotatable about an axis defined by a bearing 4a on a cover 4 for an opening 4b in the left-hand wall 4c of a transmission housing G.

The transmission housing G is formed in a single piece.

The impeller P is rigid with the shaft 2 and drives a turbine T of the torque converter, the latter being rigid with the transmission input shaft 3 which is journaled in the bearing 4a as noted previously. The stator L of the torque converter is mounted directly upon the cover 4.

Within the interior of the transmission housing G, the input shaft 3 carries a first gear (drive gear) 5 which meshes with second and third gears 7 and 12 of respective gear assemblies as described in the aforementioned copending application. The hollow shaft 3 can permit the shaft 2 to extend through the assembly and driving pump 2a which can serve to lubricate all of the meshing gears and to the moving parts, and a shaft 2b which through a spline, plug coupling or other structure 27 can be used as a power transmission without going through the gear train. The bearing 4a in the cover 4 can be constituted as a hollow shaft.

The first gear 5 meshes continuously and directly with the second gear 7, constituting a forward-drive gear, this gear 7 being rotatable upon a fixed shaft 6 fixed in the housing, a bearing 7b being provided for this purpose. The first shaft 6 projects at one end into a tubular boss 7d forming a socket on the side 4c of the housing in which the opening 4b is provided. At its other end, the shaft 6 is formed with a flange 6a which is secured to the side 4e of the transmission housing G by bolts diagrammatically represented at 6b so that shaft 6 can neither rotate nor be axially displaced in the housing.

The forward drive assembly includes a lamella or disk carrier 7a forming part of the forward directional clutch K1 with a lamella or disk carrier 9a of this clutch which can be actuated to connect the gear 7 with a fourth gear 8 journaled with the lamella carrier 9a and further lamella carrier 9b on the shaft 6 via bearings 8a. A sixth gear 10 has a lamella carrier 10a of the speed-determining clutch K2 which also forms part of the first assembly.

Figure 3:
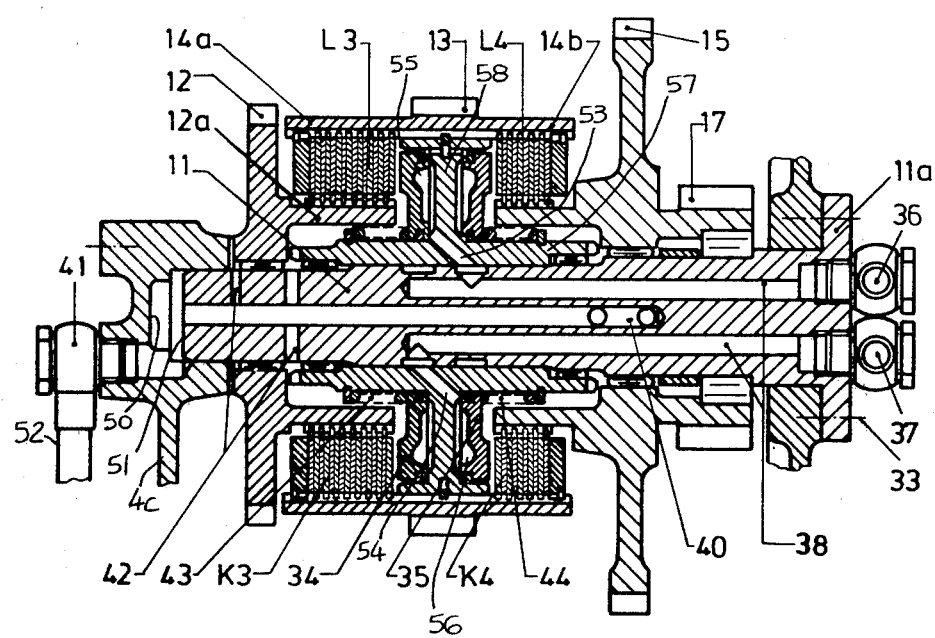
FIG. 3 is a partial section through an assembly for the second fixed shaft according to the invention.

The second assembly, which can be unitary so that it can be slipped onto the second fixed shaft 11, has been illustrated in greater detail in FIG. 3 but is otherwise similar to all of the assemblies discussed above.

More specifically, the third or reverse gear 12, which meshes continuously with the drive gear 5, carries a lamella carrier 12a which cooperates with the lamella carrier 14a with the reverse (second direction-determining) clutch K3, the latter being actuatable to couple the gear 12 with a fifth gear 13. Another lamella carrier 14b on this gear 13 forms part of a clutch K4 with a lamella carrier 15a connected to a seventh gear 15 which is jointed by a tubular shaft 16 to an eighth gear 17. The second assembly is journaled by roller bearings, diagrammatically represented at 11b in FIG. 1, upon the shaft 11 which, like the shaft 6, carries a flange 11a which enables the bolts 11c to hold the shaft in place.

Each of the assemblies is put together outside the transmission and, with the cover 4 removed, is placed in position along the respective axis, whereupon the shafts 6, 11 etc. are introduced from right to left through the walls of the transmission housing and through the respective assembly. The flanges of the shafts are then bolted to the housing. The cover 4 can then be bolted at 4f around the opening 4b. Naturally, the opening 4b must be dimensioned to permit the largest gear 15 to be inserted.

The gears 13 and 15 mesh with the gears 8 and 10 as represented by broken lines. The clutch K4 constitutes the second speed-changing clutch.

A third assembly of the type described is mounted upon a further fixed shaft 18 with its flange 18a. This assembly comprises a ninth gear 22 which meshes continuously with eighth gear 17 and is connected by a third speed-changing clutch K6 whose lamella carrier 22a is connected to gear 22 while another lamella carrier 21b is connected to the tenth gear 20 which continuously meshes with the gear 13. A fourth speed-changing clutch can also be provided with lamella carriers 19a and 21a to connect a further gear 19 on this third assembly, the gear 19 meshing continuously with an idler 25 whose idler shaft 25a has a flange 25b allowing it to be held in place from the side 4c of the transmission housing. The housing wall of this side of the housing, as shown at g1, may be formed with a boss to which the flange 25b is bolted as has been shown in FIG. 4. The opposite end of the shaft 25a can be received in an opening in a rib g2 of the housing.

An output shaft 24 is journaled in the housing and can be connected to a load via one or the other or both of a pair of connecting flanges 24a and 24b and these flanges may be secured to vehicle-wheel axles.

The output shaft 24 carries an eleventh gear 23 which meshes continuously with the gear 22.

The gear operations are more fully developed in the aforementioned copending application and a typical connection can be found in the following:

Assume the forward clutch K1 is engaged. The gear 5 drives gear 7 in the appropriate sense while the clutch K1 entrains the gear 8 in the same sense and, if the clutch K2 engages, gear 10 will drive gear 15 and gear 17 to operate the output gear 23 and the shaft 24. Since the clutches K3 through K6 are disengaged, all other gears in the system freewheel and the speed in forward drive is determined by clutch K2 and the gear trains just described.

In forward drive as well, clutch K2 may remain disengaged while clutch K4 is engaged, whereupon the gear 8 drives gear 13 and the latter will rotate gear 15 and gear 17. A similar distribution of clutch operating sequences can be seen to provide four forward speeds and three reverse speeds.

One of the gear-and-clutch assemblies has been shown in detail in FIG. 3. As can be seen from this Figure, the gear 13 can be formed upon an internally splined tube which constitutes the lamella carriers 14a and 14b, each provided with respective clutch plates lying in a plane perpendicular to the axis of the shaft 11. The gear 12 has an axially extending tubular portion forming the externally splined lamella carrier 17a whose clutch plates are fitted between the clutch plates of the lamella carrier 14a. Furthermore, the gear 15 has a first tubular extension forming the lamella carrier 15a which is also externally splined and is provided with a plurality of clutch plates received between the clutch plates of the lamella carrier 14b. The clutch plates of the clutches K3 and K4 are represented as the clutch plate stacks L3 and L4, respectively.

The actuation of the clutches can be effected hydraulically and, to this end, the wall 4c of the housing can be provided with a compartment 50 receiving the end 51 of the shaft 11 remote from the flange 11a thereof. A hydraulic return passage 40 is formed in the shaft and opens into the compartment 50 from which the return fluid is conducted by a line 52 via a fitting 41 threaded into the housing.

The flange 11a is provided with fittings 36 and 37 connected by lines 38, also formed in the fixed shaft 11, with passages 53 and 54 communicating, respectively, with pressurizable compartments 55 and 56 formed by pistons 34 and 35 which are axially shiftable upon a hollow shaft 57 surrounding the shaft 11 and constituting part of the clutch and gear assembly. Springs 43 and 44, seated against split rings on the hollow shaft 57, urge the piston toward a central flange 58 of the hollow shaft 57, the flange 58 engaging the splines of member 14a, 14b so as to be rotatable with the gear 13.

The clutch K4 is engaged by pressurization of the compartment 56 through the passage 54 from fitting 47, thereby displacing the piston 35 to the right and clamping the plates L4, thereby frictionally connecting the gear 13 with gear 15. Clutch K3 operates similarly. Bolts 32 connect the flange 11a to the clutch housing.

Figure 4:
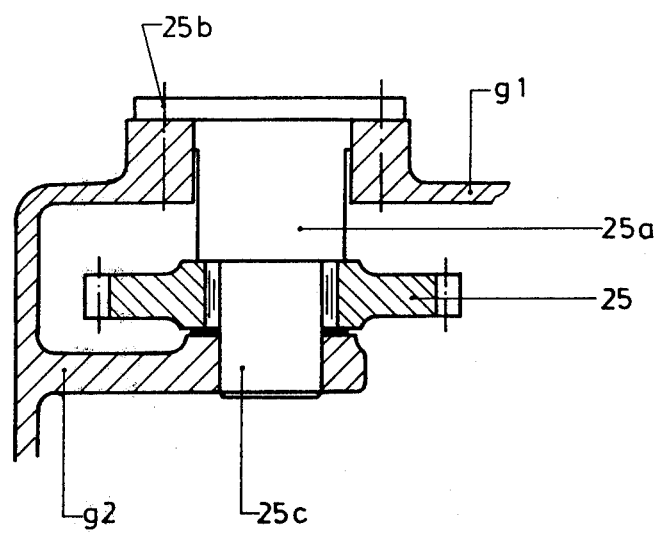
FIG. 4 is a section taken along the line IV—IV of FIG. 2.

As can be seen from FIG. 4, the shaft 25a can be provided with a step 25c which carries the gear 25 via a bearing and is, in turn, received in the bearing eye g2 of the housing G.

I claim:

1. A multispeed reversible transmission shiftable under load, comprising:
   a one-piece transmission housing formed with a window;
   a plurality of fixed shafts received in said housing and spaced apart therein;
   respective gear and clutch assemblies rotatably mounted on each of said shafts and having individually actuatable clutches but mutually and continuously meshing gears, said window being dimensioned to permit introduction of the gears and clutches of said assembly into said housing through said window;

a cover for said window detachably mountable on said housing;

an input shaft journaled on said cover and formed within said housing with a gear meshing with at least one gear of one of said assemblies,; and an output shaft journaled in said housing and operatively connected to another gear of one of said assemblies, (.) each of said fixed shafts comprising a flange at one end thereof secured to a wall of said housing; wherein said gears and clutches include:

a first gear connected to said input shaft;

second and third gears continuously meshing with said first gear and respectively journaled on first and second ones of said fixed shafts;

fourth and fifth gears respectively journaled on said first and second fixed shafts;

first and second direction-determining clutches disposed between said second and fourth gears and between said third and fifth gears on said first and second fixed shaft and a seventh gear on said second fixed shaft;

first and second speed-determining clutches interposed between said fourth and sixth gears and between said fifth and seventh gear on said first and second shafts, respectively and;

an eighth gear on said second fixed shaft connected to said seventh gear, said fourth gear meshing with said fifth gear and said sixth gear meshing with said seventh gear.

said eighth gear being operatively connected to the output shaft, said second gear, said first direction-determining clutch, said fourth gear, said first speed-determining clutch and said sixth gear constituting a unitary first assembly adapted to be introduced as a unit through said window, said third gear, said second direction-determining clutch said fifth gear, said second speed-determining clutch and said seventh and eighth gears constituting a second unitary assembly adapted to pass through said window as a unit.

2. The transmission defined in claim 1, further comprising a further fixed shaft and gear and clutch assembly, connected to said output shaft, said further assembly comprising a ninth gear meshing with said eight gear and rotatable on said further fixed shaft, a tenth gear meshing with said fifth gear and rotatable on said further fixed shaft and a third speed-determining clutch on said further fixed shaft connecting said ninth and tenth gears, said ninth and tenth gears, said ninth gear meshing with an eleventh gear connected to said output shaft.

3. The transmission defined in claim 2 wherein said further assembly includes a twelfth gear rotatable on said further fixed shaft and a fourth speed-determining clutch on said further fixed shaft connecting said tenth gear to said twelfth gear, said twelfth gear being operatively connected to said third gear.

4. The transmission defined in claim 3, further comprising an idler gear meshing continuously with said third and twelfth gears, and an idler shaft fixed on said housing and rotatably carring said idler gear.

5. The transmission defined in claim 4 wherein said idler shaft is formed with a flange connected to said housing along a side thereof provided with said window.

6. The transmission defined in claim 5 wherein the flanges of said first, second and third fixed shafts are bolted to said housing along a side thereof opposite that which is provided with said window.

7. The transmission defined in claim 6, further comprising a torque converter including a turbine connected to said input shaft, an impeller connectable to an engine, and a stator mounted on said cover.

* * * * *